(12) United States Patent
Berry, III et al.

(10) Patent No.: US 7,470,360 B2
(45) Date of Patent: Dec. 30, 2008

(54) FLUID FLOW RESTRICTION INDICATOR

(75) Inventors: Charles Henry Berry, III, Cedar Falls, IA (US); H Dianne Hammerand, Vinton, IA (US)

(73) Assignee: Engineered Products Company, Waterloo, IA (US)

( * ) Notice: Subject to any disclaimer, the term of this patent is extended or adjusted under 35 U.S.C. 154(b) by 316 days.

(21) Appl. No.: 11/040,913

(22) Filed: Jan. 21, 2005

(65) Prior Publication Data

US 2006/0163127 A1  Jul. 27, 2006

(51) Int. Cl.
*B01D 35/143* (2006.01)
(52) U.S. Cl. .......................... 210/90; 116/268; 116/270; 116/DIG. 25; 55/DIG. 34; 96/421
(58) Field of Classification Search ................. 116/268, 116/270, DIG. 25; 55/DIG. 34; 96/421; 210/90
See application file for complete search history.

(56) References Cited

U.S. PATENT DOCUMENTS

| | | | |
|---|---|---|---|
| 3,011,470 A | 12/1961 | Stoermer | |
| 3,027,865 A | 4/1962 | Kautz et al. | |
| 3,066,527 A | 12/1962 | Stein | |
| 3,119,367 A | 1/1964 | Barnes, Jr. et al. | |
| 3,312,187 A | 4/1967 | McKinlay | |
| 3,381,651 A | 5/1968 | McKinlay | |
| 3,388,682 A * | 6/1968 | Whiting | ...................... 116/268 |
| 3,487,929 A * | 1/1970 | Sample et al. | ................. 210/90 |
| 3,639,998 A | 2/1972 | Mason | |
| 3,686,835 A | 8/1972 | Strange et al. | |
| 3,916,817 A | 11/1975 | Kemp | |
| 4,033,733 A | 7/1977 | Nelson | |
| 4,162,660 A | 7/1979 | Albertson et al. | |
| 4,369,728 A | 1/1983 | Nelson | |
| 4,445,456 A | 5/1984 | Nelson | |

(Continued)

FOREIGN PATENT DOCUMENTS

DE  10315052  12/2003

(Continued)

OTHER PUBLICATIONS

"International Search Report for corresponding PCT Application No. PCT/US2006/002440", (Jun. 2, 2006), 3 pgs.

(Continued)

*Primary Examiner*—Terry K Cecil
(74) *Attorney, Agent, or Firm*—Schwegman, Lundberg & Woessner, P.A.

(57) ABSTRACT

An indicator suitable for signaling restricted flow of a fluid through a filter mounted in a filter assembly includes a housing having an inner cavity. A diaphragm disposed within the housing separates the inner cavity into first and second chambers and deflects from a neutral position in response to applied pressures within the first and second chambers. A tab assembly opposite the diaphragm includes a spring-loaded flag moveable from a first position within the housing to a second position outside the housing. A pin operably coupled to the diaphragm holds the spring-loaded flag within the housing when the diaphragm is in the neutral position. In response to the diaphragm being deflected sufficiently from the neutral position to release the pin, the spring-loaded flag travels to the second position outside the housing, thereby indicating a restricted flow condition for the filter.

12 Claims, 5 Drawing Sheets

U.S. PATENT DOCUMENTS

| | | | |
|---|---|---|---|
| 4,620,500 A * | 11/1986 | Condon | 116/268 |
| 4,688,511 A | 8/1987 | Gerlach et al. | |
| 4,726,823 A | 2/1988 | Brice | |
| 5,616,157 A | 4/1997 | Mead et al. | |
| 5,845,597 A | 12/1998 | Karpal | |
| 5,850,183 A | 12/1998 | Berry, III | |
| 6,161,417 A | 12/2000 | Nepsund | |
| 6,327,902 B1 | 12/2001 | Berry, III et al. | |
| 6,604,486 B1 | 8/2003 | Krisko et al. | |
| 7,137,303 B2 * | 11/2006 | Janik et al. | 73/744 |

FOREIGN PATENT DOCUMENTS

| | | |
|---|---|---|
| EP | 229893 A2 * | 7/1987 |
| FR | 2259637 | 8/1975 |
| GB | 0929085 | 6/1963 |
| WO | WO-2006/079067 A1 | 7/2006 |

OTHER PUBLICATIONS

"Written Opinion of the International Searching Authority for PCT Application No. PCT/US2006/002440", (Jun. 2, 2006), 4 pgs.

International Application Serial No. PCT/US2006/002440, International Preliminary Report on Patentability mailed May 2, 2008, 6 pgs.

* cited by examiner

FLUID FLOW RESTRICTION INDICATOR

BACKGROUND

The present disclosure is directed to an indicator for restricted fluid flow. More specifically, the present disclosure is directed to a visible indicator for a filter system that provides a signal when fluid flow through a filter is undesirably restricted.

Many systems include a filtered fluid intake in order to operate, and an example of such a system is an internal combustion engine. The internal combustion engine includes a filtered air intake that supplies filtered air for combustion to the cylinders. The filter can become clogged or restricted with particulates. Subsequently, airflow to the cylinders becomes restricted, which can negatively impact the performance of the engine. These performance degradations are not always immediately noticeable to the user. Taking a filter assembly apart to inspect it is often tedious. Also, a user often is not able to visually determine whether the filter is sufficiently clogged to create degradation in performance. Accordingly, there is a need for a device to indicate when a fluid filter is undesirably restricted.

Several types of indicators for restricted fluid flow are known. Some devices are relatively expensive real-time pressure indicators. Often these real-time pressure indicators reset themselves when the engine is turned off and there is no flow of air in the intake. These devices are useful when the user of the engines monitors the condition of the engine while the engine is turned on. But such indicators do not provide an indication to a service person that is maintaining or repairing the engine when the engine is turned off.

One device directed to providing a visual indication of restricted air low even after a compressor is turned off is described in U.S. Pat. No. 5,616,157. The device includes a movable ball separating two chambers. A first chamber is in communication with the filtered airflow, and a second chamber is in communication with the ambient atmosphere. As pressure drops in the first chamber as a result of a restricted airflow, the ball is drawn into the first chamber. After the ball has moved a threshold amount, the ball releases an indicator flag that remains released after the compressor has been turned off or restarted.

There is a continuing need, however, to provide a relatively inexpensive, responsive, and accurate indicator for restricted fluid flow that maintains the alert after the fluid flow has stopped.

SUMMARY

The present disclosure is directed to a relatively inexpensive visible indicator for a filter system that provides a signal when fluid flow through the filter is undesirably restricted and maintains the signal after the system is turned off. The indicator is responsive and accurate, and can be formed as a relatively low-profile device to be suitable for a wide variety of systems and applications.

In particular, the disclosure is directed to an indicator suitable for signaling restricted flow of a fluid through a filter mounted in a filter assembly. The indicator includes a housing having an inner cavity. A deflectable diaphragm is disposed within the housing and separates the inner cavity into first and second chambers with a generally fluid-tight seal. The first chamber is adapted to be in fluid communication with the filter assembly, and the diaphragm is deflectable from a neutral position in response to applied pressures within the first and second chambers. A tab assembly is included in the indicator opposite the diaphragm from the first chamber. The tab assembly includes a hole. The tab assembly also includes a flag moveable along a first axis from a first position wherein the flag is within the housing and a second position wherein the flag extends from the housing. A pin is operably coupled to the diaphragm and protrudes along a second axis from the diaphragm into the hole and through the tab assembly when the diaphragm is in at least the neutral position. The second axis is nonparallel to the first axis. Movement of the flag from the first position to the second position is actuated in response to the diaphragm being deflected a selected amount from the neutral position into the first chamber and the pin being removed from the tab assembly.

The indicator includes several advantages, and a few of the advantages are mentioned here. For example, the indicator can be easily manufactured to include low-cost polymeric parts. The design of the indicator can provide for a larger diaphragm, which is more accurate and responsive than other examples of the related art. Also, the first and second axis operation described above provides for a lower profile device than some of the examples of the related art, enabling the indicator to be used in tight spaces and in a variety of systems and applications.

DESCRIPTION

This disclosure relates to an indicator for restricted fluid flow. The disclosure, including the figures, describes the indicator with reference to a several illustrative examples. For example, the disclosure proceeds with respect to an airflow indicator used with an internal combustion engine, as described below. However, it should be noted that the present invention could be implemented in other system or with other fluids, as well. The present invention is described with respect to the airflow indicator for illustrative purposes only. Also, the disclosure includes particular examples of the indicator, but by no means is the disclosure limited to the examples below. Other examples are contemplated and are mentioned below or are otherwise imaginable to someone skilled in the art. The scope of the invention is not limited to the few examples, i.e., the described embodiments of the invention. Rather, the scope of the invention is defined by reference to the appended claims. Changes can be made to the examples, including alternative designs not disclosed, and still be within the scope of the claims.

Figure 1:
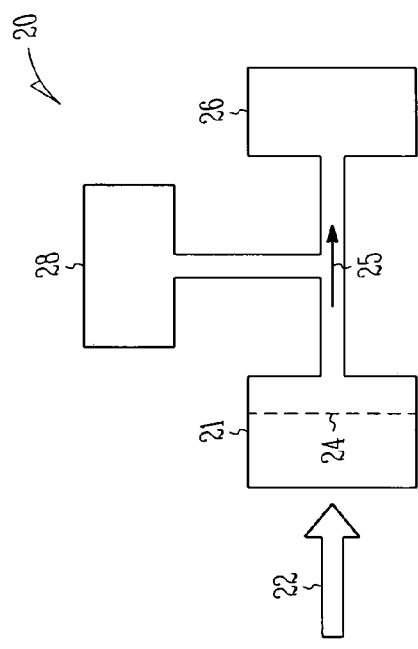
FIG. 1 is a schematic view of an environment of the present disclosure.

FIG. 1 is a schematic view of a system 20 having a filtered fluid intake. The system 20 includes a filter assembly 21 and other operative components 26. The filter assembly 21 includes a fluid filter 24. Fluid 22 enters the system 20 and is passed through the fluid filter 24. Filtered fluid 25 is then passed through the filter assembly 21 to the operative components 26. An indicator 28 is disposed in the system 20 so as to be in fluid communication with the filtered fluid 25 in the filter assembly 21. In one example, the system 20 is an internal combustion engine. Air is passed through an air filter, and filtered air is supplied to the cylinders of the internal combustion engine. The indicator 28 is disposed in the system to be in fluid communication with the filtered air flowing to the cylinders. As the filter 24 becomes dirty or is otherwise clogged with particulates, fluid flow is restricted to the operative components 26. Based on the restricted flow, the indicator 28 inferentially senses the filter is clogged and provides a signal to an operator.

Figure 2B:
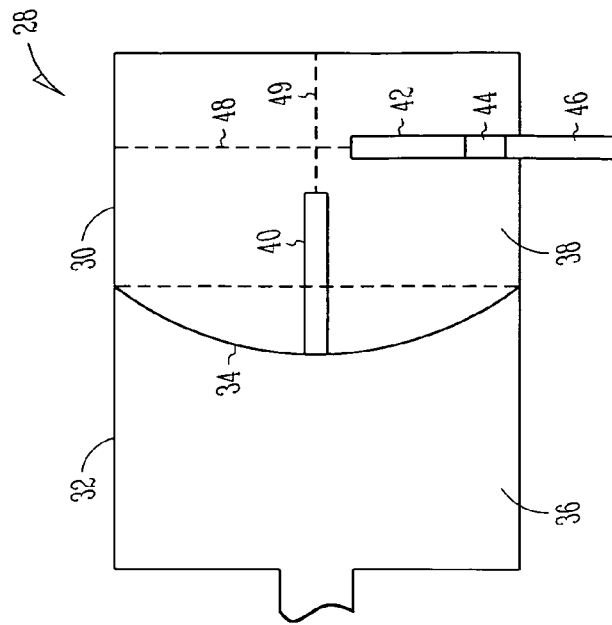
FIGS. 2A and 2B are schematic views of an indicator of the present disclosure.
Figure 2A:
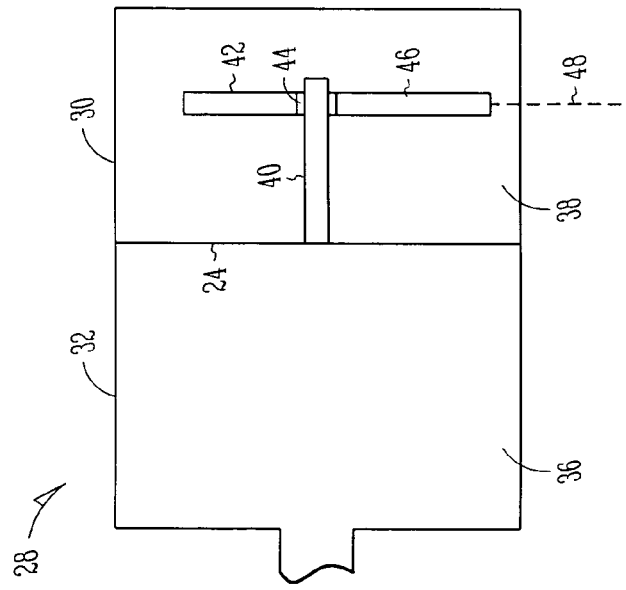

FIGS. 2A and 2B are schematic views of the indicator 28. The indicator 28 includes housing 30 having an inner cavity 32. A deflectable diaphragm 34 is disposed within the housing 30 and separates the inner cavity 32 into a first chamber 36 and a second chamber 38. The diaphragm 34 provides a generally fluid-tight seal between the chambers 36, 38. "Generally fluid-tight" refers to a seal that has a leakage rate low enough to not interfere with the operation of the diaphragm and the indicator. The first chamber 36 is adapted to be in fluid communication with the filter assembly 21, as indicated above. In one example of the internal combustion engine application, the second chamber is in fluid communication with the ambient atmosphere. FIG. 2A shows the diaphragm 34 in a neutral position. The diaphragm 34 is deflectable from the neutral position in response to applied fluid pressures within the first and second chambers 36, 38. The diaphragm 34 is also operably coupled to a pin 40 that extends into the second chamber 38 in the example. The indicator 28 also includes a tab assembly 42 disposed within the second chamber 38 in the example. The tab assembly 42 has a hole 44 adapted to receive the pin 40. The tab assembly includes a flag 46 moveable along a first axis 48. FIG. 2A shows the flag 46 in a first position where the flag is disposed within the housing 30. In FIG. 2B, the flag 46 is in a second position where the flag 46 extends from the housing 30.

FIGS. 2A and 2B illustrate how the flag 46 moves from the first position to the second position. In FIG. 2A, the pin 40 protrudes along a second axis 49 from the diaphragm 34 into the hole 44 and through the tab assembly 42 when the diaphragm is in at least the neutral position. The second axis 49 is nonparallel to the first axis 48, and in the example the axes 48, 49 are generally orthogonal to one another. As fluid pressure in the first chamber 36 is decreased relative to the pressure in the second chamber 38, the diaphragm 34 is urged into the first chamber 36 and away from the neutral position 34a. When the differential pressure in the chambers 36, 38 has surpassed a threshold or selected amount, the flag 46 is actuated and moves into the second position. In the example, the deflected diaphragm removes the pin 40 from the hole in the tab assembly 42, and the biased flag 46 is actuated to be in the second position. In the example, the flag 46 remains in the second position until the operator resets the indicator 20.

Figure 3:
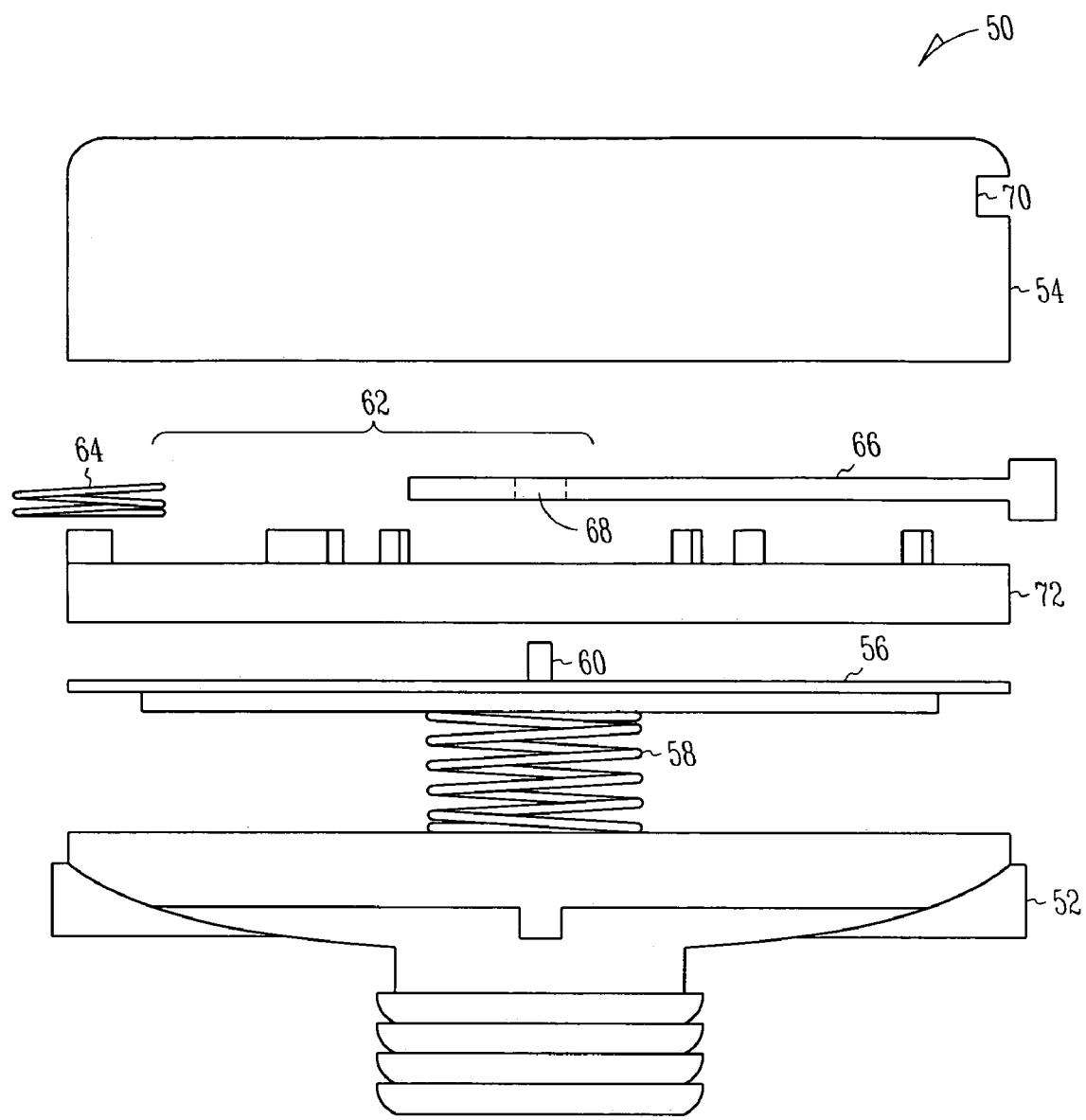
FIG. 3 is an exploded view of a particular example of the indicator of FIGS. 2A and 2B.

FIG. 3 shows one example of the indicator 28. The example indicator 50 includes a base 52 that is adapted to be coupled with a cover 54 to form an internal cavity. A deflectable diaphragm 56 is disposed within the internal cavity and against internal edges of the base 52. A first chamber is formed between the diaphragm 56 and base 52, and a second chamber is formed between the diaphragm 56 and cover 54. A calibration spring 58 is disposed within the first chamber and acts between the base 52 and diaphragm 56. The diaphragm is operably coupled to a pin 60 that extends into the second chamber. A tab assembly 62 is disposed within the second chamber and includes a reset spring 64 and a flag 66. The flag 66 includes a hole 68 that is adapted to mate with the pin 60 when the flag 66 is in the first position. The reset spring 64 biases the flag 66 and urges the flag 66 through an opening 70 in the cover 54 to the second position when the pin 60 is removed from the hole 68. A guide plate 72, in this example, is disposed in the second chamber and provides a path of movement for flag 66 as it travels between the first and second positions.

Figure 4:
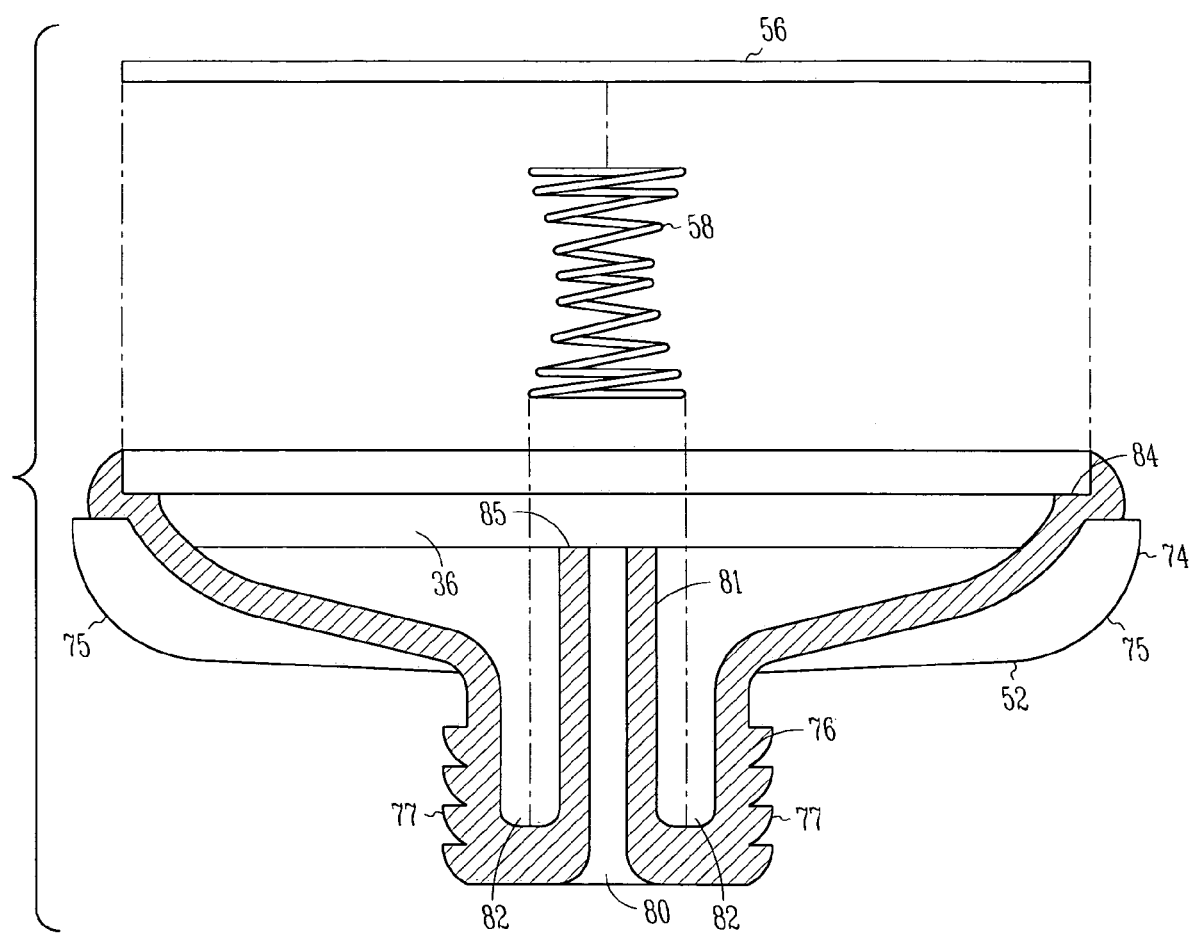
FIG. 4 shows a partial cutaway side view of a portion of the particular example of FIG. 3.

FIG. 4 shows a more detailed view of the components of the example indicator 50 including the base 52 and calibration spring 58. The base 52 includes a foundation 74 connected with a tap 76. The example shows the foundation 74 integrally formed with the tap 76, but other connections between the two are contemplated.

The tap 76 is adapted to attach the indicator 50 to the filter assembly 21. In the example, the tap includes circumferential ridges 77 that can create a fluid-tight seal between the tap 76 and the filter assembly 21. For instance, the tap 76 can be fit into a filter head of filter assembly on an internal combustion engine. The circumferential ridges 77 form a generally airtight seal with the filter assembly and no grommet is needed. The tap can also be adapted to fit with any number of filter assemblies, and include such features as pitched threads, extensions with ridged lips (to connect to a filter hose), or the like, to provide a generally fluid-tight seal with the selected filter assembly. The tap 76 also includes an inlet 80 that leads into the interior of the base 52. An elongate tube 81 that extends into and concentrically within the tap forming a recess 82 defines the inlet 80. The recess 82 is used to house the calibration spring 58. When the base 52 is coupled to a filter assembly, the inlet is in fluid communication with the filter assembly and the first chamber.

The calibration spring 58 provides low-pressure calibration of the diaphragm 56. The spring 58 provides a holding force to prevent deflection of the diaphragm 56. When the fluid pressure is sufficiently low in the first chamber relative to the pressure in the second chamber, the spring 58 is designed to compress and to allow the pin 60 to release the flag 66. In the example, the spring 58 is an hourglass-shaped compression spring to reduce the likelihood of buckling. Preferably, the spring includes a resonant frequency outside of the operating range of the system 10. In the example where the spring 58 is used with an internal combustion engine, the resonant frequency is chosen to be outside the range of 500 Hz to 6000 Hz.

The foundation 74 is preferably pan-shaped, or "birdbath-like," as indicated in the figures where the foundation 74 is wider than the tap 76. The exterior of the foundation 74 can be constructed to include angularly spaced-apart ribs 75 to add rigidity to the base 52 and to support the indicator 50 on a filter head of a filter assembly, or the like. The example includes an interior lip 84 and inlet tip 85 positioned to prevent overdeflection of the diaphragm 56 that may cause damage to the indicator 50. The pan-shaped feature of the foundation 74 is advantageous in that it permits the use of diaphragm having a relatively large surface area as compared to the size of the indicator 50. The large surface area of the diaphragm 52 provides for a more responsive diaphragm 52 and for more accurate deflection of the diaphragm 52.

Figure 5A:
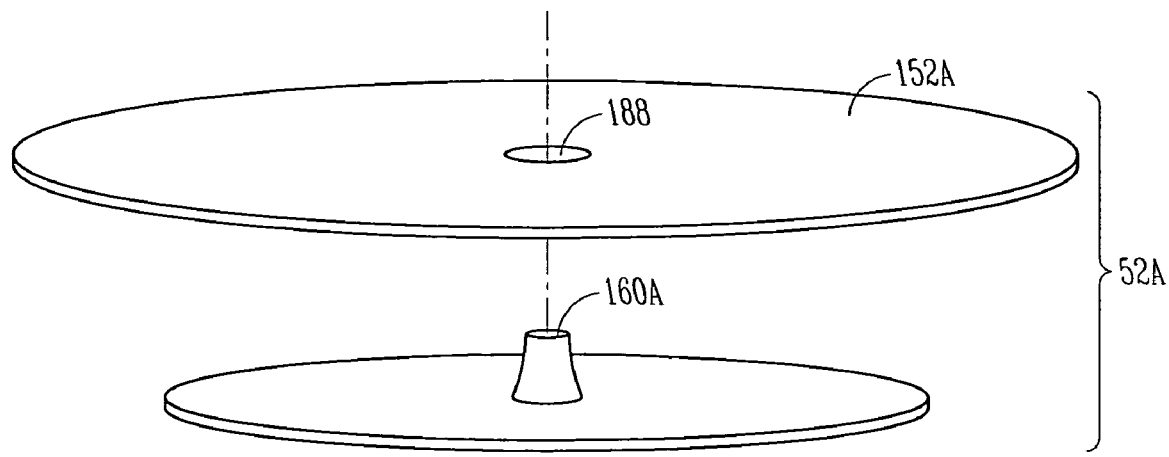
FIGS. 5A, 5B and 5C shows perspective views of three examples of the diaphragm operably coupled to the pin suitable for use in the example of FIG. 3.
Figure 5B:
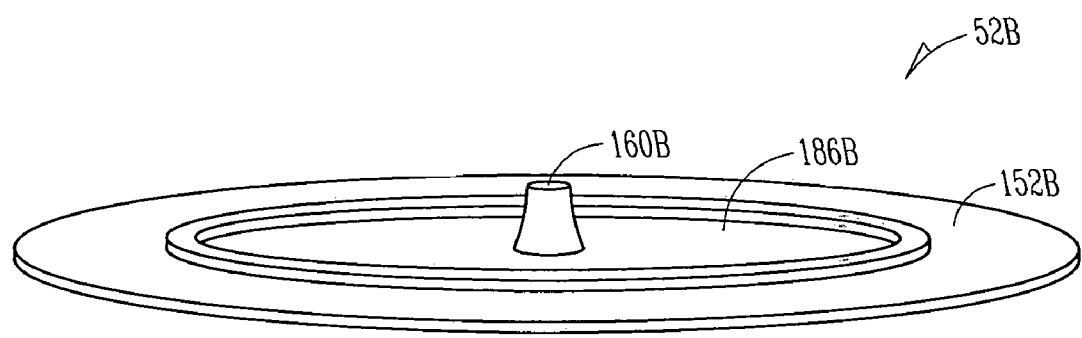
Figure 5C:
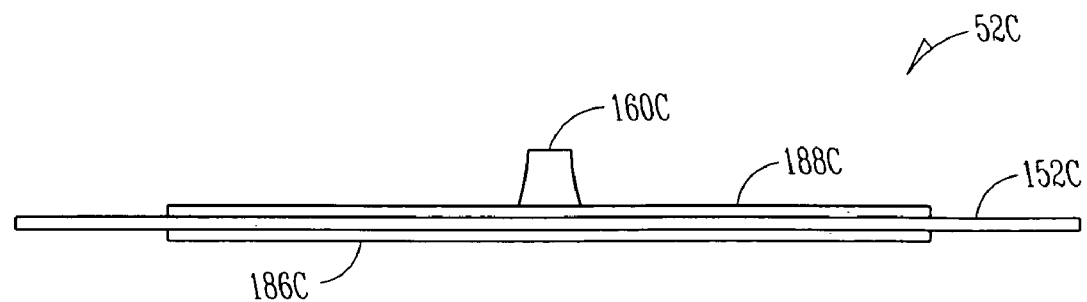

FIGS. 5A, 5B and 5C show three different examples of diaphragms operably coupled to a pin that are suitable for use with the example indicator 50. The first example diaphragm 52a, shown in FIG. 5A, includes a generally compliant diaphragm member 152a and a generally stiff protector disk 186a with pin 160a. The diaphragm member 152a has a diameter large enough to fit across the foundation 74 and provide a generally fluid-tight seal in the first chamber around the edges of the diaphragm 152*a*. The protector disk 186*a* has a diameter that is smaller than the diameter of the diaphragm member 152*a* and permits the edges of the diaphragm member 152*a* to deflect into the first chamber. The protector disk 186*a* is disposed between the diaphragm member 152*a* and the calibration spring 58, and provides a suitable surface to act against the spring 58 and protect the diaphragm member 152*a* from tearing. The pin 160*a* fits through a hole 188 in the diaphragm member 152*a* to extend into the second chamber and engage the tab assembly 42. The pin 160*a* fits into the hole 188 so as to still provide a low enough fluid leakage rate to permit the indicator 50 to operate correctly. In the example indicated, the disk 86*a* and the diaphragm 52 are not otherwise attached to each other in diaphragm 52*a*.

The second example, shown in FIG. 5B, includes a diaphragm member 52*b* having a relatively stiff inner disk 186*b* with pin 160*b* and a relatively compliant outer ring 152*b* attached to each other to form a single piece component. The compliant outer ring 152*b* is wide enough to permit a flexible seal throughout the full stroke of deflection and intended temperature range of the indicator 50. The stiff inner disk 186*b* obviates the need for the protector disk 186*a* in the two-piece diaphragm-pin shown above in FIG. 5A. The diaphragm member 52*b* is manufactured to form a generally fluid-tight seal between the inner disk 186*b* and the outer ring 152*b*.

The third example, shown in FIG. 5C, includes a diaphragm 52*c* having a relatively compliant member 152*c* sandwiched between two relatively stiff disks 186*c*, 188*c*. The disks 186*c* and 188*c* are riveted together. Disk 186*c* is adapted to act against the calibration spring 58. Disk 188*c* includes an integrally formed pin 160*c* adapted to actuate the tab assembly 62.

Figure 6:
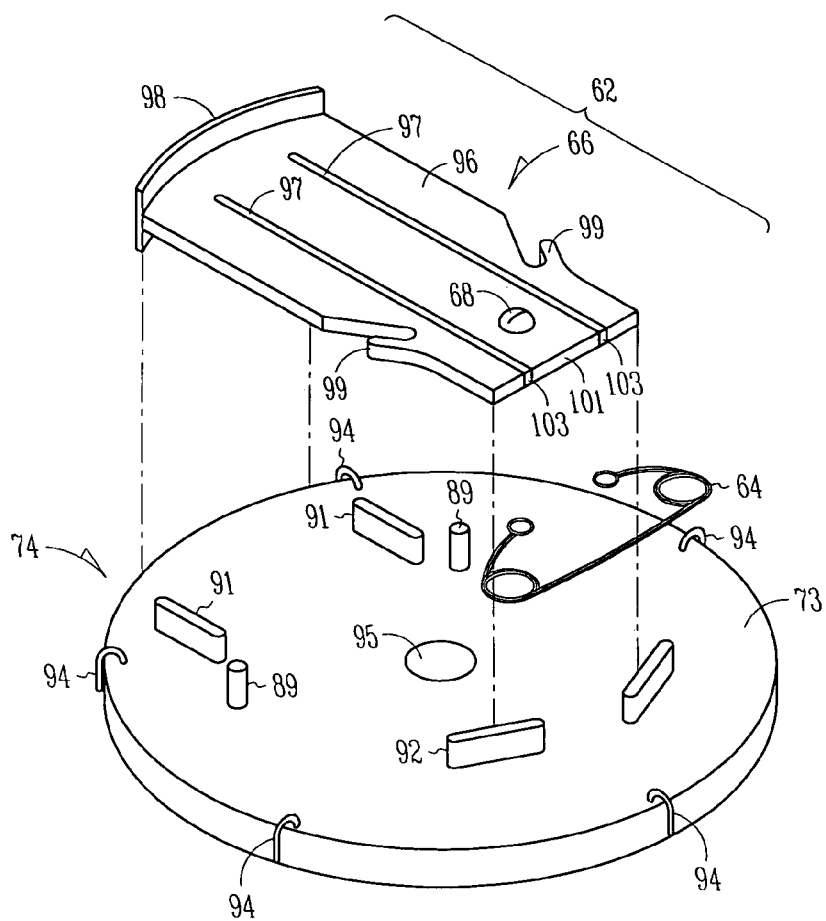
FIG. 6 shows an exploded perspective view of a selected portion of the indicator in the example of FIG. 3.

FIG. 6 shows a particular example of the guide plate 72 and tab assembly 62. The tab assembly 62 includes the flag 66 and reset spring 64. The guide plate 72 can be used to compress the diaphragm 52 against the foundation 74 to create the seal when the indicator 50 is assembled. The guide plate 72 includes a main surface 73. The guide plate 72 in the example provides structures to define a path of movement for the flag 66. The guide plate also can provide a surface against which the reset spring 64 can be coiled. The reset spring 64 can also act against the cover 54. The illustrated guide plate includes several case supports 89 that are used to maintain a space between the guide plate 72 and the cover 54 to permit free movement of the flag 66. Flag guides 91 limit lateral movement of the flag 66. In this particular example, the guide plate 72 also includes a reset spring support 92, which interfaces with the reset spring 64. Height locks 94 are disposed around the periphery of the guide plate 72 to maintain the main surface 73 of the guide plate in a generally parallel plane with the base surface of the cover 54. The guide plate also includes a hole 95 through which the pin 60 can extend to engage the tab assembly 62. As it will be understood, the structures to define the path of flag and reset spring can also be included in the cover 54.

FIG. 6 shows one particular example of the tab assembly 62. The flag 66 includes a major section 96 and a flange 98. The major section 96 includes the hole 68 adapted to mate with the pin 60 to keep the tab assembly 62 loaded in the first position. A flange 98 is included to reduce the amount of dust or other particles entering into the internal cavity. The flange 98 also is pressed to reset the indicator and move the flag 66 from the second position back to the first position. In the example, the flag 66 extends slightly through the opening 70 in the cover 54 and the flange 98 is disposed outside of the cover 54. The major section 96 is generally disposed within the cover 54 when the tab assembly 62 is in the first position. At least a portion of the major section 96 is exposed outside of the cover 54 when the tab assembly 62 is in the second position.

The major section 96 can include several additional components or features. For example, the major section 96 includes skid ribs 97 that reduce surface contact between the flag 66 and the guide plate 72 or, in some examples, the cover 54. The major section 96 also includes a stop 99 that acts against one of the structures of the guide plate (or cover), such as case supports 89, to prevent the flag 66 from becoming dislodged from the indicator 50. In addition, the major section 96 can include an angled edge 101 to aid in locking guiding the pin 60 into the hole 68 when the flag 66 is moved from the second position to the first position. The major section 96 can also include a retainer portion 103, or retainer edge, that engages the reset spring 64. In the particular example, the reset spring is a torsion spring.

Figure 7:
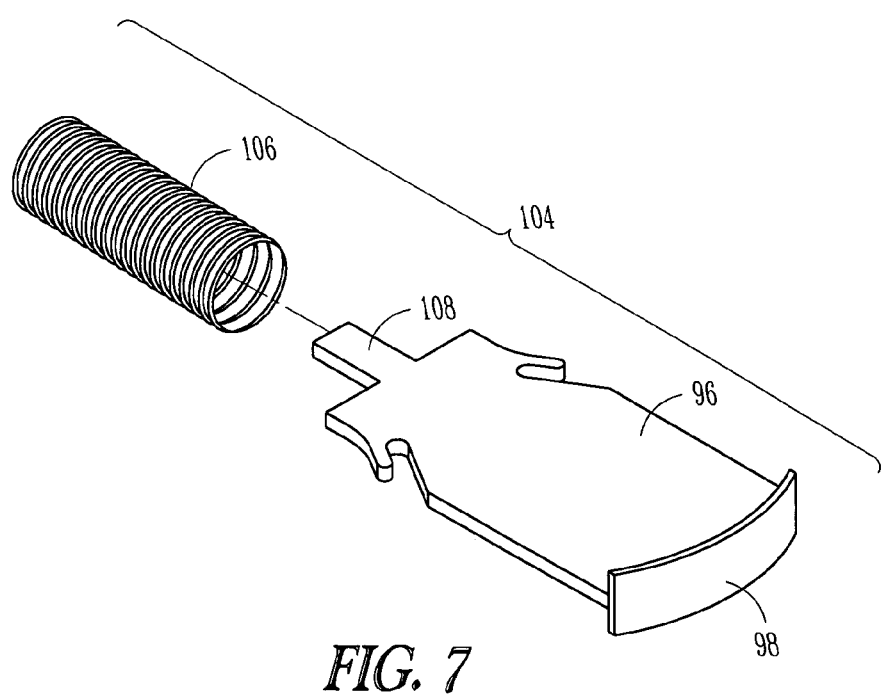
FIG. 7 shows a second embodiment of a component in the portion of FIG. 6 in the example of FIG. 3.

FIG. 7 shows another embodiment of the tab assembly 104. In the embodiment, the reset spring 106 is a compression spring. The flag 66 includes a bull nose 108 on the major section 96 and opposite the flange 98 to interface with the spring 106. The bull nose 108 can be inserted into the compression spring coil and an interference fit is used to hold the spring in place.

The present invention has now been described with reference to several embodiments. The foregoing detailed description and examples have been given for clarity of understanding only. Those skilled in the art will recognize that many changes can be made in the described embodiments without departing from the scope and spirit of the invention. Thus, the scope of the present invention should not be limited to the exact details and structures described in this disclosure, but rather by the appended claims and equivalents.

What is claimed is:

1. An indicator suitable for signaling restricted flow of a fluid through a filter mounted in a filter assembly, the indicator comprising:

a housing having an inner cavity;

a deflectable diaphragm disposed within the housing and separating the inner cavity into first and second chambers with a generally fluid-tight seal, wherein the first chamber is adapted to be in fluid communication with the filter assembly, wherein the diaphragm is deflectable from a neutral position in response to applied pressures within the first and second chambers;

a tab assembly having a hole through the tab assembly, the tab assembly including a flag moveable along a first axis from a first position wherein the flag is within the housing and a second position wherein the flag extends from the housing, the tab assembly opposite the diaphragm from the first chamber;

a guide plate disposed in the second chamber between the diaphragm and the tab assembly;

a pin operably coupled to the diaphragm and protruding along a second axis from the diaphragm into the hole and through the tab assembly when the diaphragm is in at least the neutral position, wherein the second axis is generally perpendicular to the first axis and the guide plate includes a guide plate hole receiving the pin; and wherein the tab assembly includes a reset spring acting against the guide plate and the flag and wherein the tab assembly is biased in the first position with the reset spring and urged toward the second position and wherein movement of the flag from the first position to the second position is actuated in response to the diaphragm being deflected a selected amount from the neutral position into the first chamber and the pin being removed from the tab assembly.

2. The indicator of claim 1 wherein the diaphragm resists movement from the neutral position into the first chamber with a biasing member.

3. The indicator of claim 2 wherein the biasing member is a spring.

4. The indicator of claim 3 wherein the spring is disposed in the first chamber and against the housing and the diaphragm.

5. The indicator of claim 4 wherein the diaphragm includes a deflectable member and a relatively stiff inner member, and wherein the inner member interfaces with the spring.

6. The indicator of claim 1 wherein the diaphragm has a width, and the width is greater than a length of the inner cavity measured along the second axis.

7. The indicator of claim 6 wherein the diaphragm is circular and the width is a diameter of the circular diaphragm.

8. An indicator suitable for signaling restricted flow of a fluid through a filter mounted in a filter assembly, the indicator comprising:
    a housing having a base and a cover defining an inner cavity;
    a deflectable diaphragm disposed within the housing and separating the inner cavity into first and second chambers with a generally fluid-tight seal, wherein the base and diaphragm at least partially define the first chamber, and the cover and diaphragm at least partially define the second chamber;
    a calibration spring disposed in the first chamber and acting against the base and diaphragm to resists movement of the diaphragm from a neutral position;
    wherein the first chamber is adapted to be in fluid communication with the filter assembly and the diaphragm is deflectable from the neutral position in response to applied pressures within the first and second chambers;
    a tab assembly having a hole through the tab assembly, the tab assembly including a flag and a reset spring, wherein the flag is moveable along a first axis from a first position wherein the flag is within the housing and a second position wherein the flag extends from the housing, the tab assembly opposite the diaphragm from the first chamber;
    a guide plate disposed in the second chamber between the diaphragm and the tab assembly, the guide plate having a main surface, wherein the main surface is spaced-apart from the cover, wherein the reset spring acts against the guide plate and the flag;
    a pin operably coupled to the diaphragm and protruding along a second axis from the diaphragm through the guide plate and into the hole and through the tab assembly when the diaphragm is in at least the neutral position, wherein the second axis is generally perpendicular to the first axis; and
    wherein the flag is biased in the first position and movement of the flag from the first position to the second position is actuated in response to the diaphragm being deflected a selected amount from the neutral position into the first chamber and the pin being removed from the tab assembly.

9. The indicator of claim 8 wherein the calibration spring is a compression spring.

10. The indicator of claim 9 wherein the base includes a foundation and a tap, wherein the tap includes an inlet defining a recess in the tap, and the calibration spring is disposed with the recess.

11. The indicator of claim 9 wherein the reset spring is a compression spring.

12. The indicator of claim 9 wherein the guide plate includes structures adapted to space-apart the main surface of the guide plate from a base portion of the cover.

* * * * *